(12) United States Patent
Matsuda

(10) Patent No.: US 7,619,798 B2
(45) Date of Patent: Nov. 17, 2009

(54) OPTICAL DEFLECTOR AND LIGHT BEAM SCANNING APPARATUS HAVING A CONTROL MECHANISM UTILIZING ELECTROMECHANICAL TRANSDUCERS FOR ADJUSTING RESONANT FREQUENCY FOR STABLE SCANNING

(75) Inventor: Shinya Matsuda, Takarazuka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 98 days.

(21) Appl. No.: 11/640,681

(22) Filed: Dec. 18, 2006

(65) Prior Publication Data

US 2007/0146858 A1   Jun. 28, 2007

(30) Foreign Application Priority Data

Dec. 27, 2005   (JP) .............................. 2005-374697
Dec. 6, 2006    (JP) .............................. 2006-329201

(51) Int. Cl.
   *G02B 26/08*   (2006.01)
(52) U.S. Cl. ................................. 359/199.4; 359/224.1
(58) Field of Classification Search ......... 359/198–199, 359/224; 310/311
   See application file for complete search history.

(56) References Cited

U.S. PATENT DOCUMENTS

| | | | | |
|---|---|---|---|---|
| 5,694,237 A | * | 12/1997 | Melville | 359/214 |
| 6,049,407 A | | 4/2000 | Melville | 359/198 |
| 6,331,909 B1 | * | 12/2001 | Dunfield | 359/199 |

FOREIGN PATENT DOCUMENTS

| | | |
|---|---|---|
| JP | 3-154019 A | 7/1991 |
| JP | 5-45603 A | 2/1993 |
| JP | 5-142050 A | 6/1993 |
| JP | 8-146334 A | 6/1996 |

* cited by examiner

*Primary Examiner*—Stephone B Allen
*Assistant Examiner*—Jennifer L. Doak
(74) *Attorney, Agent, or Firm*—Sidley Austin LLP

(57) ABSTRACT

An optical deflector and a light beam scanning apparatus characterized by stable amplitude and speed wherein the fluctuation of the resonant frequency resulting from various factors such as a temperature change is corrected to a predetermined level, and the amplitude of the resonant scanner is kept to a predetermined level. An electromechanical transducer is used as a control element to control the potential difference resulting from the electric charge occurring in the control element caused by rotational vibration of the optical deflector, whereby the fluctuation of the resonant frequency resulting from various factors such as a temperature change is corrected to a predetermined level and the amplitude of the resonant scanner is kept at a predetermined level. This arrangement provides an optical deflector and a light beam scanning apparatus characterized by stable amplitude and speed.

18 Claims, 14 Drawing Sheets

OPTICAL DEFLECTOR AND LIGHT BEAM SCANNING APPARATUS HAVING A CONTROL MECHANISM UTILIZING ELECTROMECHANICAL TRANSDUCERS FOR ADJUSTING RESONANT FREQUENCY FOR STABLE SCANNING

This application is based on Japanese Patent Application No. 2005-374697 filed on Dec. 27, 2005, and No. 2006-329201 filed on Dec. 6, 2006, in Japanese Patent Office, the entire content of which is hereby incorporated by reference.

TECHNICAL FIELD

The present invention relates to an optical deflector and light beam scanning apparatus, particularly to an optical deflector and a light beam scanning apparatus provided with an electromechanical transducer that vibrates in synchronism with rotational vibration of the optical element.

BACKGROUND

The optical deflector is used to scan the direction of a light beam such as a laser beam by means of an optical element. It is employed by a wide range of applications in a writing system of a digital photocopier and laser printer and in a display system of a laser display and retina display, as well as in a barcode reader, laser microscope, laser processing apparatus and three-dimensional measuring instrument. A polygon scanner with a rotating polygon mirror (Examined Japanese Patent Application Publication No. H6-52196) and a galvanometer scanner for causing rotational vibration of a single mirror are utilized. Further, a thin resonant scanner based on the semiconductor manufacturing technique (wafer process) has been proposed.

The resonant scanner employs a combination of a torsion beam and a single mirror to form a torsional vibration system based on the restoring force of the torsion beam and the inertia moment of the mirror. A high deflection speed is made compatible with a great deflection angle by driving at the resonant frequency of this system. The resonant scanner is characterized by reduced energy requirements resulting from a small mass of the movable portion and a prolonged service life achieved by absence of a sliding portion such as a bearing.

The torsion beam of a resonant scanner is generally manufactured by etching or similar processing of a silicon or other plate-like material. If the torsion beam is subjected to a change in outer dimension due to expansion and shrinkage resulting from temperature changes, the restoring force is also changes. In the meantime, since the inertia moment is hardly changed by the fluctuation of the outer dimensions due to expansion and shrinkage caused by temperature changes, the resonant frequency of the system fluctuates as a result. Further, the resonant frequency may fluctuates due to a change in the spring constant resulting from cyclic fatigue of the torsion beam or a change in ambient conditions such as air resistance.

In the vicinity of the resonant frequency, the amplitude exhibits an abrupt change in response to the frequency of a drive signal. Thus, if the frequency of the drive signal is fixed, the amplitude of the resonant scanner greatly fluctuates due to resonant frequency fluctuation. To meet this situation, the drive signal frequency may be made to follow the resonant frequency fluctuation. This method can maintain the amplitude constant, but the drive frequency fluctuates. This causes difficulties, because of change in an aspect ratio, for example, in an application of a video display where the scanning is in synchronism with a two-dimensional data.

The following proposals have been made to keep the resonant scanner amplitude at a constant level by correcting the resonant frequency fluctuation. the first is a method of adjusting the resonant scanner temperature to a constant level using a heater (e.g., Japanese Registration. Patent No. 2711158). The second is a method of adjusting the tension at a constant level using a mechanism for pulling a torsion beam (e.g., Laid-Open Japanese Patent Application Publication No. H8-146334). The third is a method of using electric force to correct the amplitude fluctuation (e.g., Laid-Open Japanese Patent Application Publication No. H5-45603).

The method disclosed in the Japanese Registration Patent No. 2711158, however, is not practical because of poor response in temperature control and extra power that must be consumed for heating. Further, the method disclosed in the Laid-Open Japanese Patent Application Publication No. H8-146334 is also not practical because the mechanism for controlling the tension by elongation deformation is too complicated and difficult to adjust due to a high sensitivity to fluctuation. Further, the method mentioned in the Laid-Open Japanese Patent Application Publication No. H5-45603 is also not practical because adjustment is difficult due to abrupt and non-linear amplitude fluctuation, and extra power must be utilized.

SUMMARY

An object of the present invention is to solve the aforementioned problems and to provide an optical deflector and light beam scanning apparatus of stable amplitude and speed by correcting the fluctuation in resonant frequency caused by temperature change and many other factors is corrected to a constant level, and the resonant scanner amplitude is kept constant. In view of forgoing, one embodiment according to one aspect of the present invention is an optical deflector for scanning light beam, comprising:

an optical element which rotationally vibrates about a rotation axis;

a vibration member which includes the optical element;

a drive element for driving the vibration member by deforming, the drive element being provided on the vibration member and constituted of a rectangular electromechanical transducer with a longer side thereof being in a direction perpendicular to the rotation axis;

a control element for generating an electric charge depending on deformation of the vibration member, the control element being provided on the vibration member and constituted of a rectangular electromechanical transducer with a longer side thereof being in a direction perpendicular to the rotation axis; and an voltage control element for controlling a difference in potential caused by the electric charge generated in the control element.

According to another aspect of the present invention, another embodiment is a light beam scanning apparatus for scanning a light beam one-dimensionally or two-dimensionally, comprising:

an optical deflector for scanning the light beam, the optical deflector including:

an optical element which rotationally vibrates about a rotation axis;

a vibration member which includes the optical element;

a drive element for deforming and driving the vibration member, the drive element being provided on the vibration member and constituted of a rectangular electromechanical transducer with a longer side thereof being in a direction perpendicular to the rotation axis;

a control element for generating an electric charge depending on deformation of the vibration member, the control element being provided on the vibration member and constituted of a rectangular electromechanical transducer with a longer side thereof being in a direction perpendicular to the rotation axis;

an voltage control element for controlling a difference in potential caused by the electric charge generated in the control element; and a control circuit for controlling an operation of the control element, the control circuit having:

a detection section for detecting the deformation of the vibration member caused by the rotational vibration; and a control element drive section which applies a drive signal to the control element for driving the vibration member, wherein the control circuit makes the control element drive section stop applying the drive signal to the control element at a predetermined timing while making the detection section detect the deformation of the vibration member caused by the rotational vibration, and the predetermined timing is when a direction of the rotational vibration of the vibration member switches.

According to another aspect of the present invention, another embodiment is a light beam scanning apparatus for scanning a light beam one-dimensionally or two-dimensionally, comprising:

an optical deflector for scanning the light beam, the optical deflector including:

an optical element which rotationally vibrates about a rotation axis;

a vibration member which includes the optical element;

a drive element for deforming and driving the vibration member, the drive element being provided on the vibration member and constituted of a rectangular electromechanical transducer with a longer side thereof being in a direction perpendicular to the rotation axis;

a control element for generating an electric charge depending on deformation of the vibration member, the control element being provided on the vibration member and constituted of a rectangular electromechanical transducer with a longer side thereof being in a direction perpendicular to the rotation axis;

an voltage control element for controlling a difference in potential caused by the electric charge generated in the control element; and a control circuit for controlling an operation of the control element, the control circuit having:

a detection section for detecting the deformation of the vibration member caused by the rotational vibration; and a control element drive section which applies a drive signal to the control element for driving the vibration member, wherein the control circuit makes the control element drive section stop applying the drive signal to the control element at a predetermined timing while making the detection section detect the deformation of the vibration member caused by the rotational vibration, and the predetermined timing is when the scanning of the light beam is stopped.

BRIEF DESCRIPTION OF THE DRAWINGS

FIG. 12 is a schematic diagram showing an example wherein a two-dimensional resonant scanner formed of the resonant scanners combined in the horizontal and vertical directions is used for surface scanning in a laser display or the like;

DETAILED DESCRIPTION OF THE PREFERRED EMBODIMENT

Figure 1:
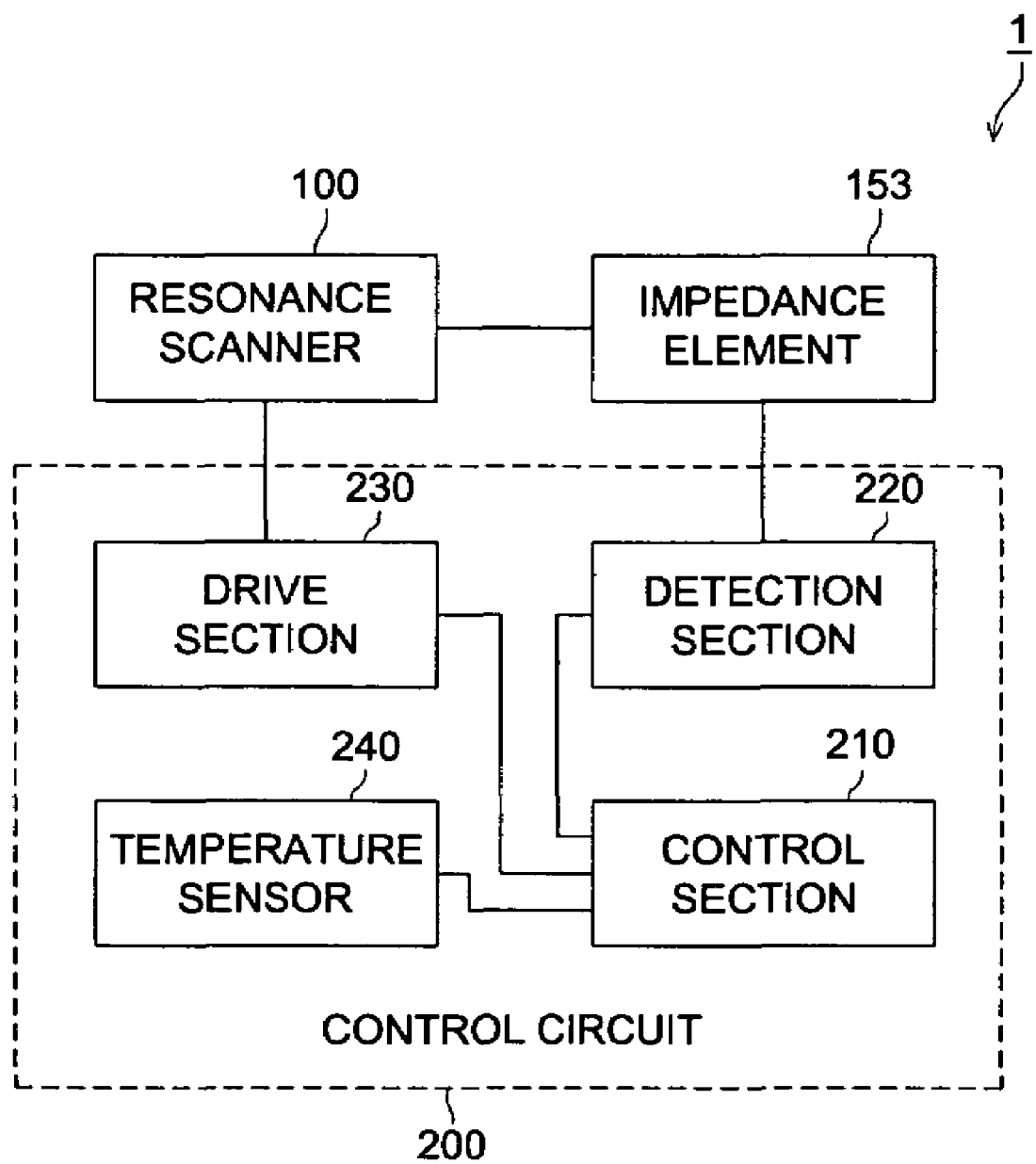
FIG. 1 is a block diagram representing an example of a structure of an optical deflector as an embodiment of the present invention.

The following describes the present invention with reference to the illustrated embodiments without the present invention being restricted thereto. The same or equivalent portions in the drawings will be assigned with the same numerals of reference, and will not be described to avoid duplication.

In the first place, the first embodiment of the present invention will be explained with reference to FIG. 1 through FIG. 10. FIG. 1 is a block diagram representing an example of the structure of an optical deflector as an embodiment of the present invention.

In FIG. 1, an optical deflector 1 includes a resonant scanner 100, an impedance element 153 as a voltage control element and a control circuit 200. The resonant scanner 100 and impedance element 153 will be described in details with reference to FIG. 2(a), FIG. 2(b), FIG. 3(a) and FIG. 3(b). The control circuit 200 includes a control section 210 for controlling the operation of an optical deflector 1;

a detection section 220 for detecting the vibration of the resonant scanner 100; a drive section 230 for applying the drive signal to drive the resonant scanner 100; and a temperature sensor 240 for detecting the temperature in the vicinity of the resonant scanner 100.

FIGS. 2(a) and 2(b) are schematic diagrams representing the structure of the resonant scanner 100 constituting the optical deflector 1. FIG. 2(a) is a front view, and FIG. 2(b) is a side view showing the structure as viewed from the direction A in FIG. 2(a).

In FIGS. 2(a) and 2(b), the resonant scanner 100 contains a mirror 101 as an optical element, a torsion beam 102, a driving piece 103, a projection 104, a retaining section 105, and a piezoelectric element 111 as an electromechanical transducer, and is formed in a bilateral symmetry centering on the mirror. 101. The mirror 101 performs rotational vibration about the rotation axis 121. In this case, the mirror 101, torsion beam 102, driving piece 103 and projection 104 work as a vibration member in the present invention.

The driving piece 103 forms a rectangle whose long side is in the direction perpendicular to the rotation axis 121. Likewise; the piezoelectric element 111 forms a rectangular thin plate whose long side is in the direction perpendicular to the rotation axis 121. Overall or partial electrodes are provided on the front and rear surfaces of the thin plate, and voltage is applied between the electrodes on both surfaces, whereby electromechanical transducing function is implemented.

The mirror 101, torsion beam 102, driving piece 103, projection 104 and retaining section 105 are formed by processing a thin slice of silicon by a semiconductor wafer process. Two pairs of driving pieces 103 are each located on the top and bottom of the right and left torsion beams 102 in the drawing. As shown on the right top of FIG. 2(a), a piezoelectric element 111 is bonded by adhesion on each of the front and rear surfaces of the driving piece 103. The projection 104 is provided to avoid torsional deformation of the driving piece 103. The retaining section 105 is provided to fix the resonant scanner 100 to an external enclosure.

Figure 2:
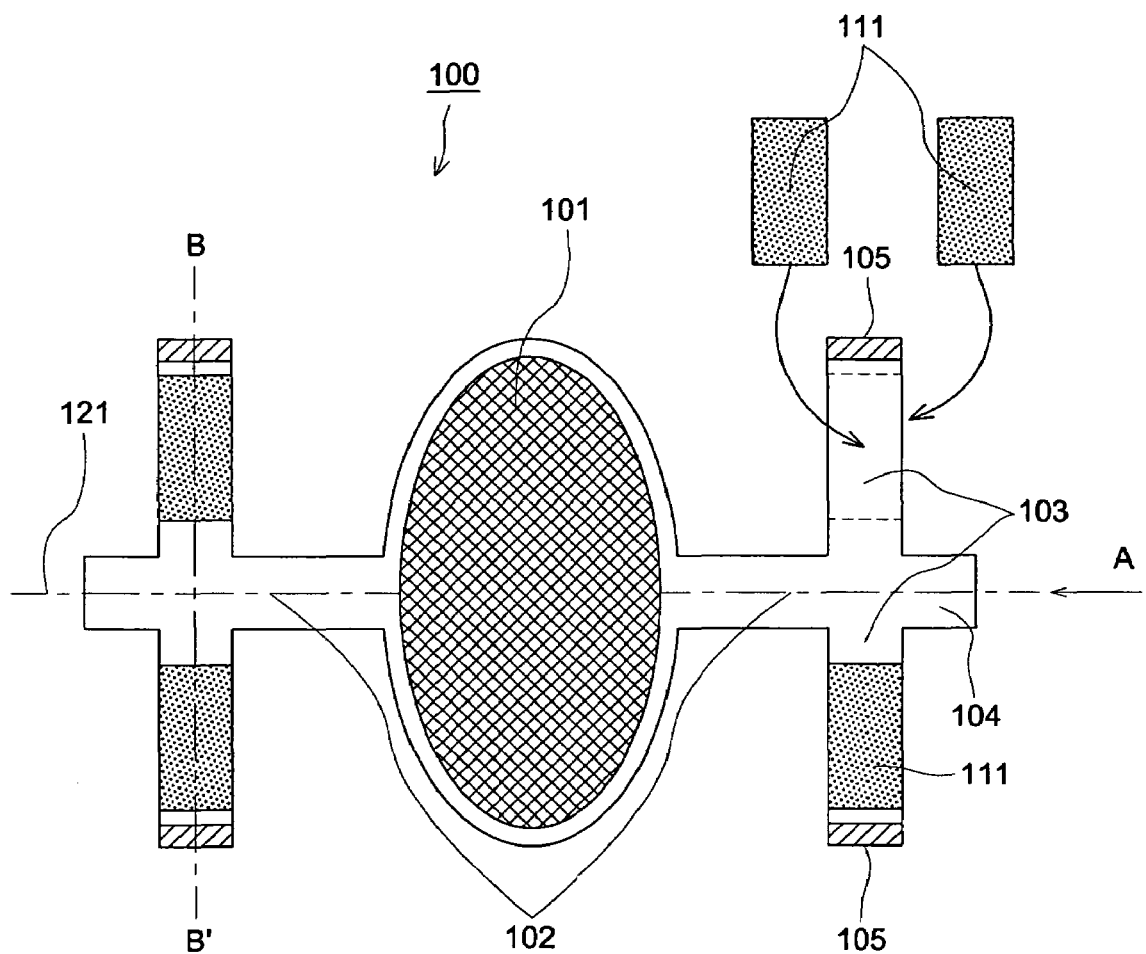
FIG. 2(a) is a schematic diagram (front view) representing the structure of a resonant scanner constituting an optical deflector.
FIG. 2(b) is a schematic diagram (side view) representing the structure of a resonant scanner constituting the optical deflector.
Figure 2:
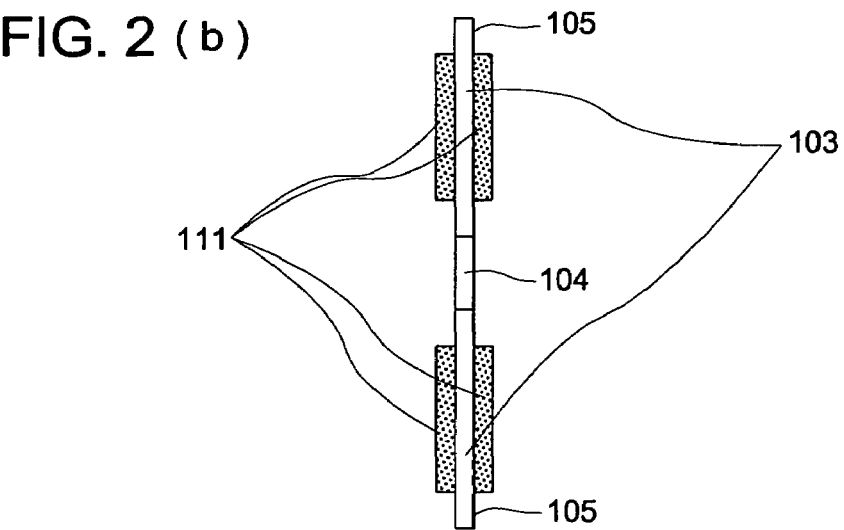
Figure 3A:
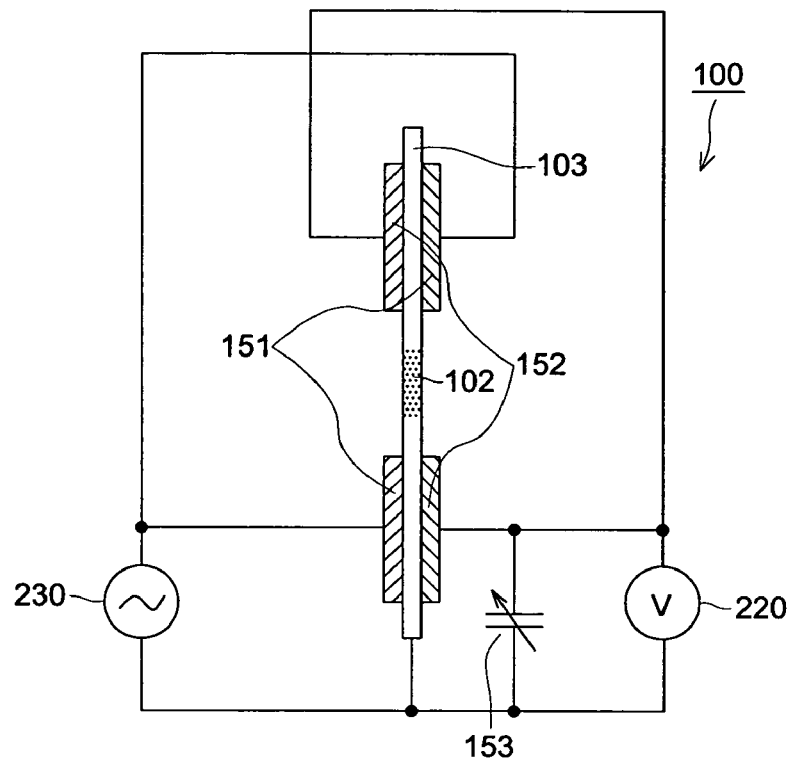
FIG. 3(a) is a schematic cross sectional view showing the configuration of the drive element (in a quiescent state)
Figure 3B:
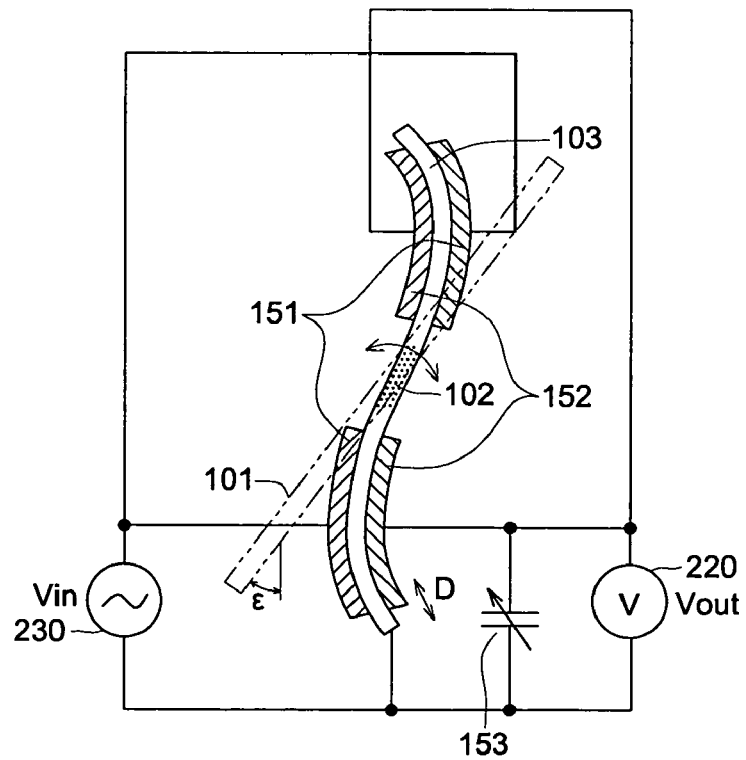
FIG. 3(b) is a schematic cross sectional view showing the configuration of the drive element (in a deformed state) during the drive of the resonant scanner.

FIG. 3 is a schematic cross sectional view taken along line B-B' of FIG. 2(a), showing the configuration of the driving piece 103 during the drive of the resonant scanner 100. In FIG. 3(a), the driving piece is in a quiescent state, while in FIG. 3(b), the driving piece is deformed.

In FIG. 3(a), of four piezoelectric elements 111, the piezoelectric elements on the right top and left bottom will be called the drive element 151 in the following description, and those on the left top and right bottom will be called the control element 152. The drive elements 151 are designed in the so-called unimorph structure where single-plate piezoelectric elements attached to the driving piece 103, and the drive elements 151 are arranged vertically in a rotational symmetry with the torsion beam 102 sandwiched in-between, as described above. As shown in FIG. 3(b), bending deformation is produced when the drive signal Vin of the same phase is given by the drive section 230. The torsion beam 102 is rotated and vibrated by this bending deformation. When the frequency of the rotational vibration coincides with the resonant frequency ω in the entire system of the resonant scanner 100, the amplitude of the rotational vibration of the mirror 101 is maximized.

The control element 152 is arranged face to face with the drive element 151 with the driving piece 103 sandwiched in-between, and a potential difference Vout is produced by the electric charge resulting from the force of bending deformation by the drive element 151. The control element 152 has the same dimensions as the drive element 151, and is arranged in line symmetry with the drive element on the front and rear surfaces. Assume that the terminal on the side of the control element 152 is kept open and the potential difference Vout is measured. Then the amount of the deformation is the same for the drive element 151 and the control element 152 and the phase of the drive signal Vin is opposite to that of the potential difference Vout. The amount of deformation D of the control element 152 and the amount of charge Eout having been generated are approximately linear with respect to each other, although there is a slight hysteresis, as will be described later with reference to FIG. 4. Thus, the amount of deformation D can be detected by detecting the amount of charge Eout or the potential difference Vout caused by this charge.

Figure 8:
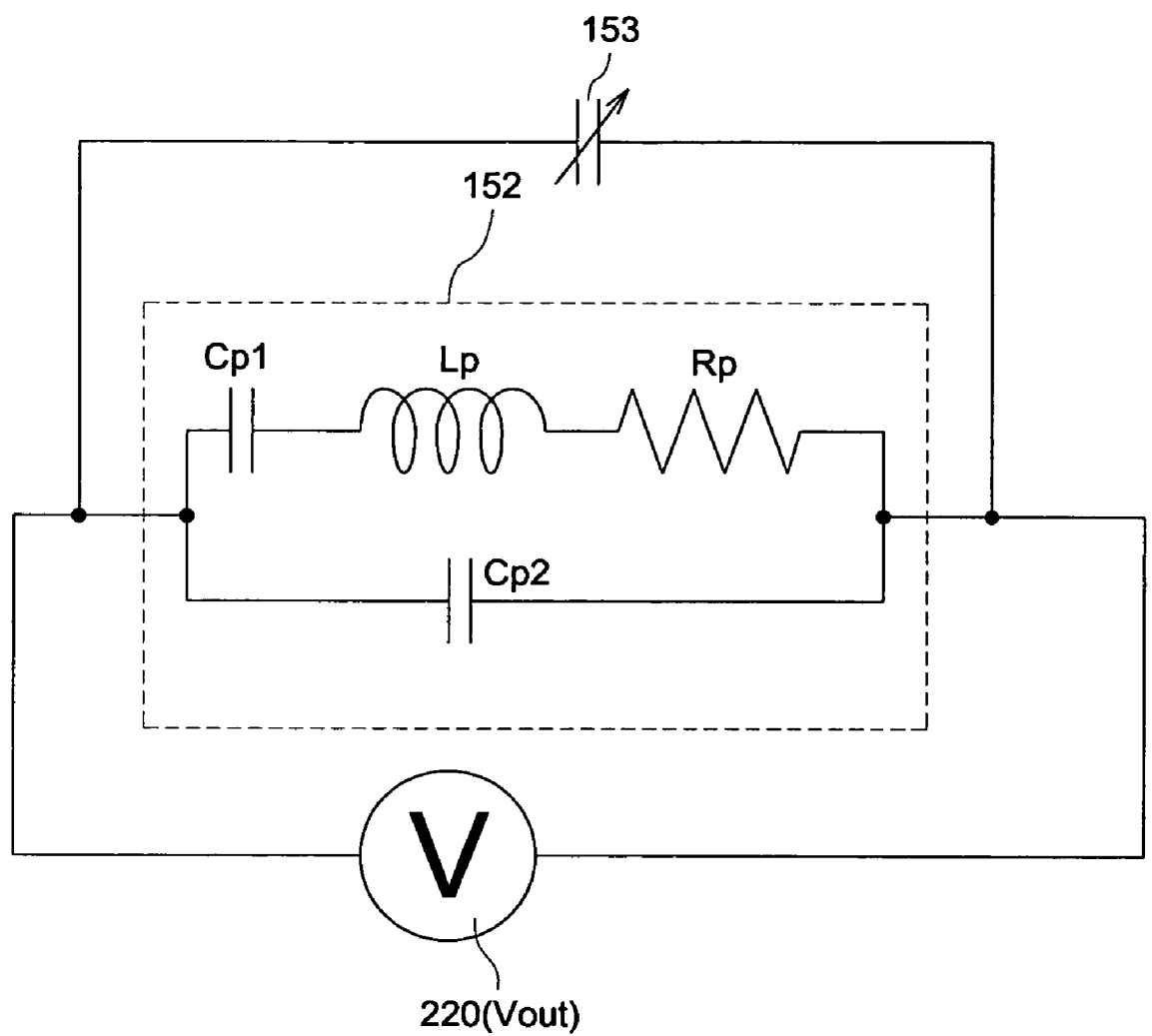
FIG. 8 is a circuit diagram showing the equivalent circuit of the piezoelectric element constituting the control element and the method of adjusting the resonant frequency.
Figure 9:
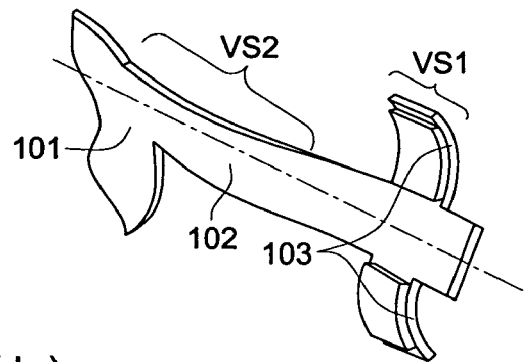
FIGS. 9(a), 9(b) and 9(c) are schematic diagrams showing a vibration system to illustrate the requirements that must be met by a resonant scanner.
Figure 9:
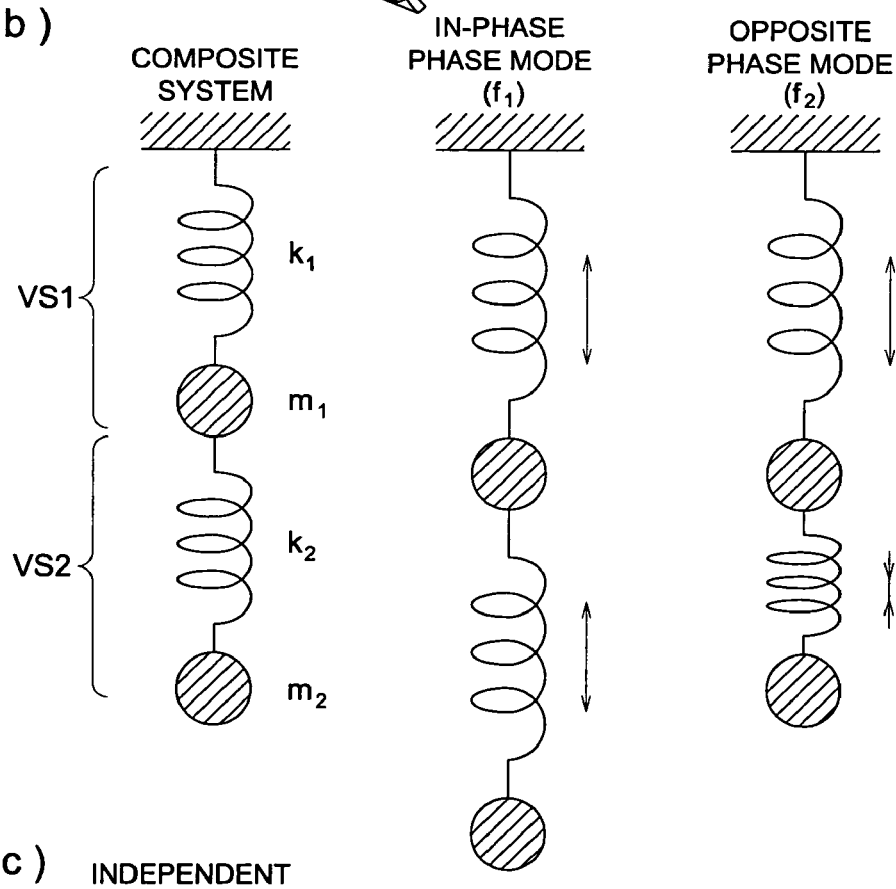
Figure 9:
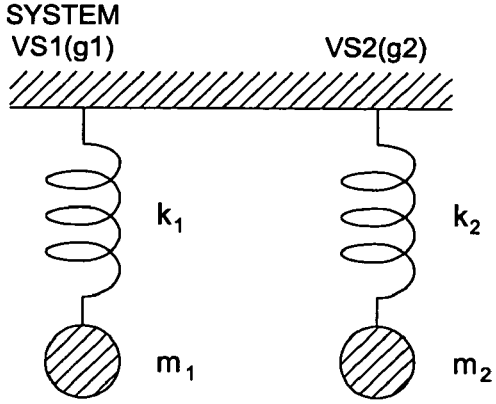

At least one of the control elements 152 is connected with the detection section 220 for measuring the aforementioned potential difference Vout and the impedance element 153 to be discussed in details with reference to FIG. 8. For simplicity, two control elements 152 are connected in parallel with one detection section 220 and one impedance element 153 in FIG. 3. However, they can be treated as independent elements and the two control elements 152 may be connected separately. Alternatively, only any one of the control elements 152 can be connected. This selection can be made properly.

Figure 4:
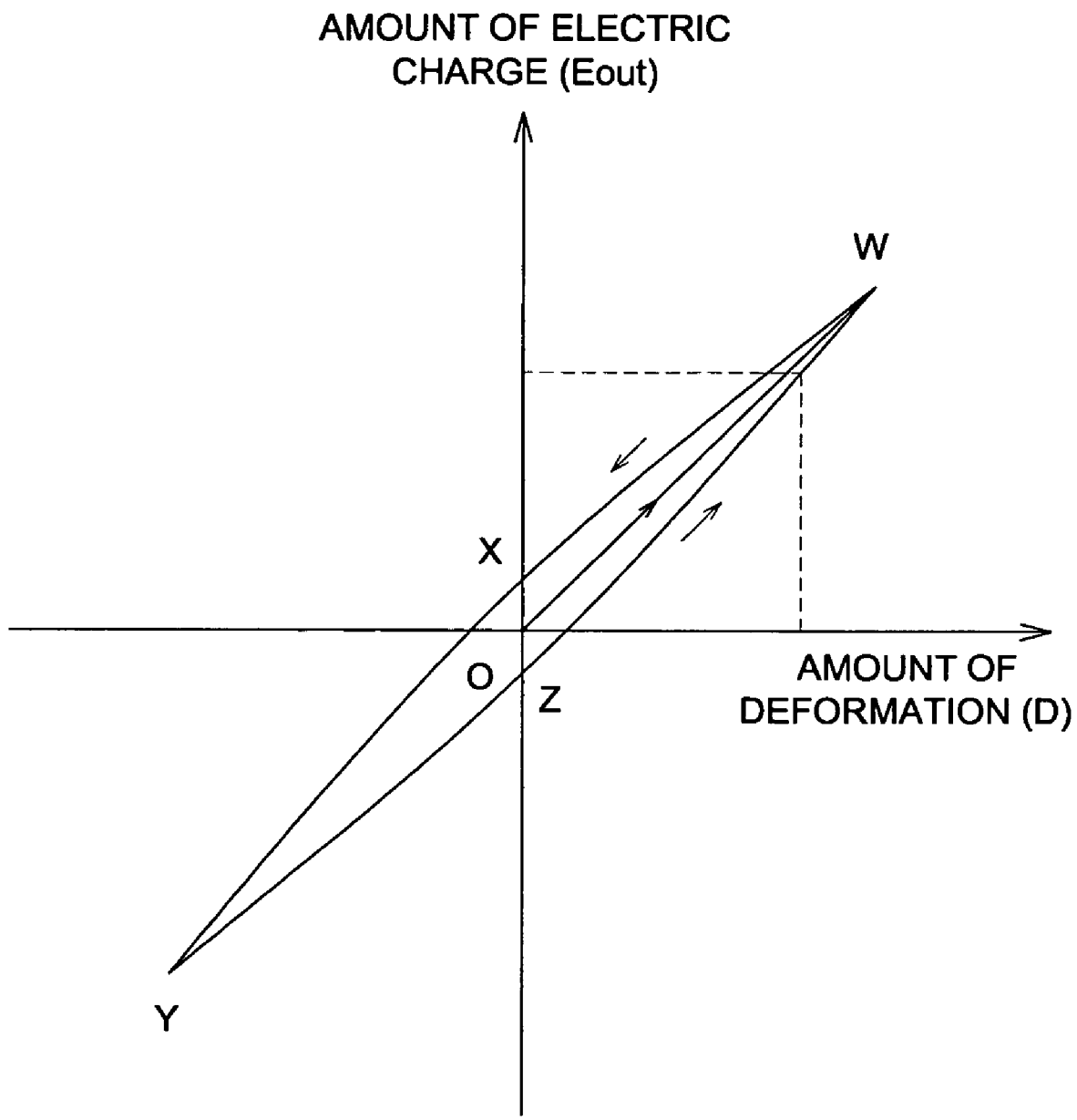
FIG. 4 is a graph showing the relationship between the deformation of a control element and the electric charge to be generated.

FIG. 4 is a graph showing the relationship between the deformation D of the control element 152 made up of a piezoelectric element 111, and the amount of charge Eout to be generated.

As shown in FIG. 4, in the piezoelectric element, when the amount of deformation D is added (at point W of the chart) subsequent to sufficient removal of distortion (at origin of the chart), an electric charge approximately in direct ratio to the amount of deformation D is generated. When the amount of deformation D is returned to 0 (zero) (at point X of the chart), a slight hysteresis occurs and a positive electric charge remains. When the amount of deformation D diametrically opposed to point W is added (at point Y of the chart), an electric charge diametrically opposed to point W is generated. When the amount of deformation D is returned to 0 (zero), a slight hysteresis is generated and a negative charge remains.

Conversely, if the axis of the amount of charge Eout is assumed as the voltage Vin applied to the piezoelectric element, the same relationship as the aforementioned holds between the applied voltage Vin and the amount of deformation D. An approximately linear deformation D can be obtained with respect to the applied voltage Vin, although there is a slight hysteresis. In the meantime, the amount of deformation D of the control element 152 and the deflection angle ε of the mirror 101 have a predetermined relationship. Thus, the deflection angle ε of the mirror 101 can be detected by detecting the potential difference Vout caused by the electric charge generated at the control element 152.

Figure 5:
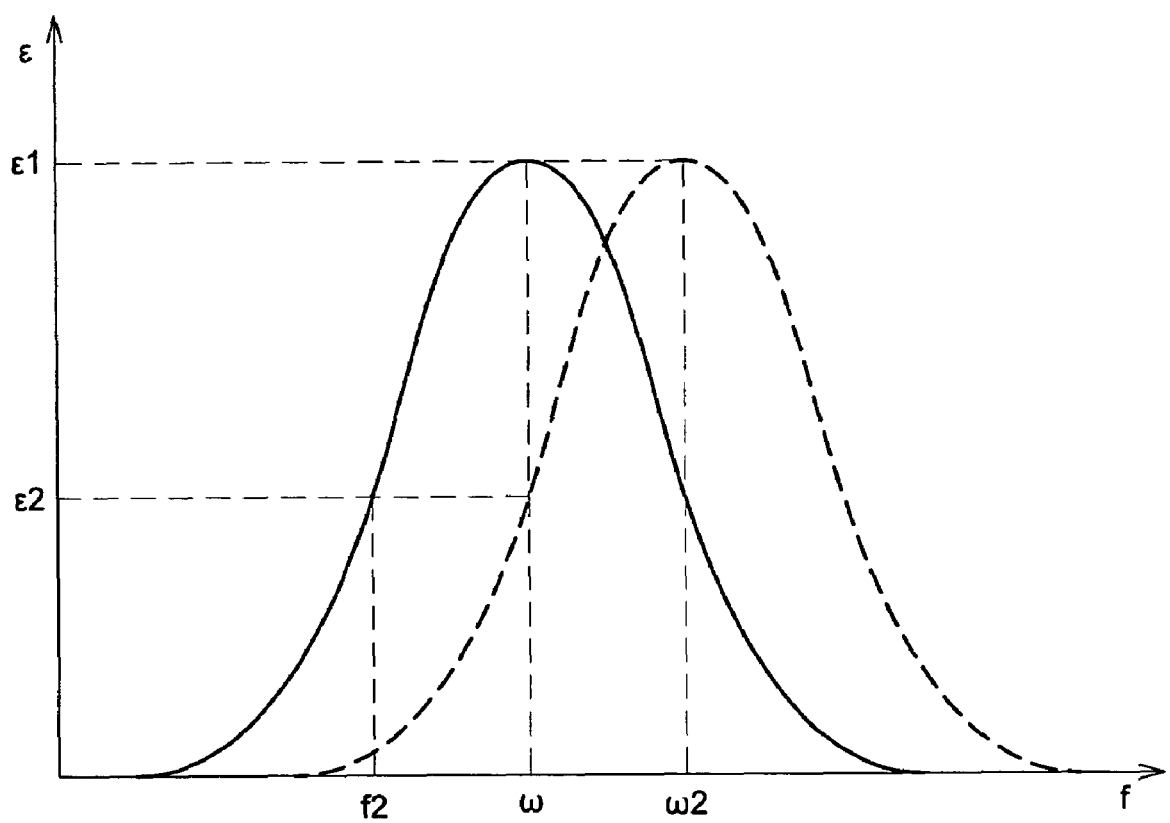
FIG. 5 is a graph showing the relationship between the drive frequency of the drive element and the deflection angle of the mirror in a resonant scanner.
Figure 6:
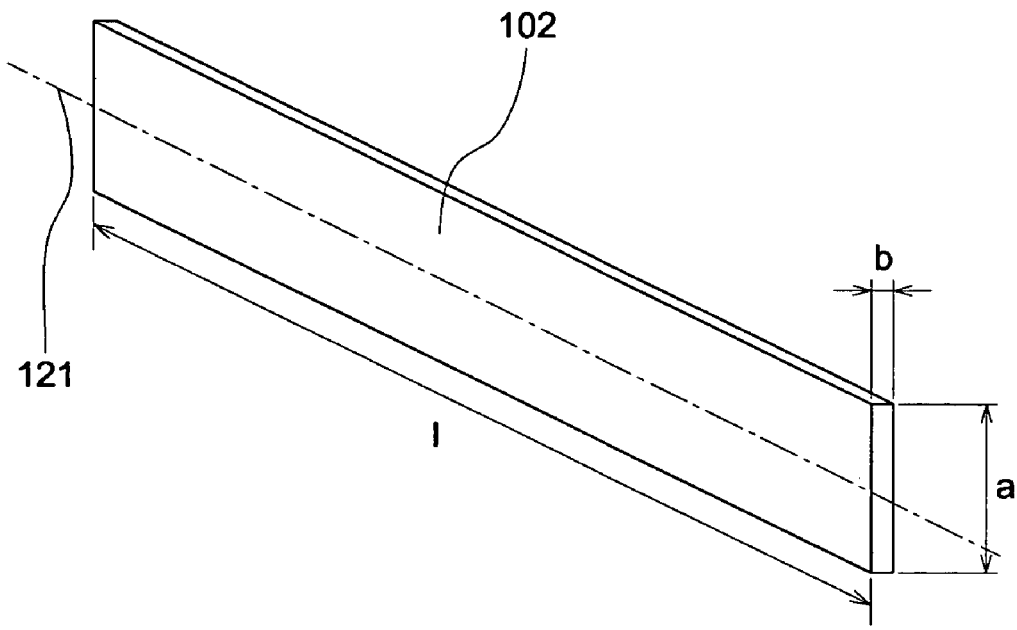
FIG. 6(a) is a schematic diagram representing the torsion beam in a quiescent state.
FIG. 6(b) is a schematic diagram showing the state of twist in the rotational vibration of torsion beam.
Figure 6:
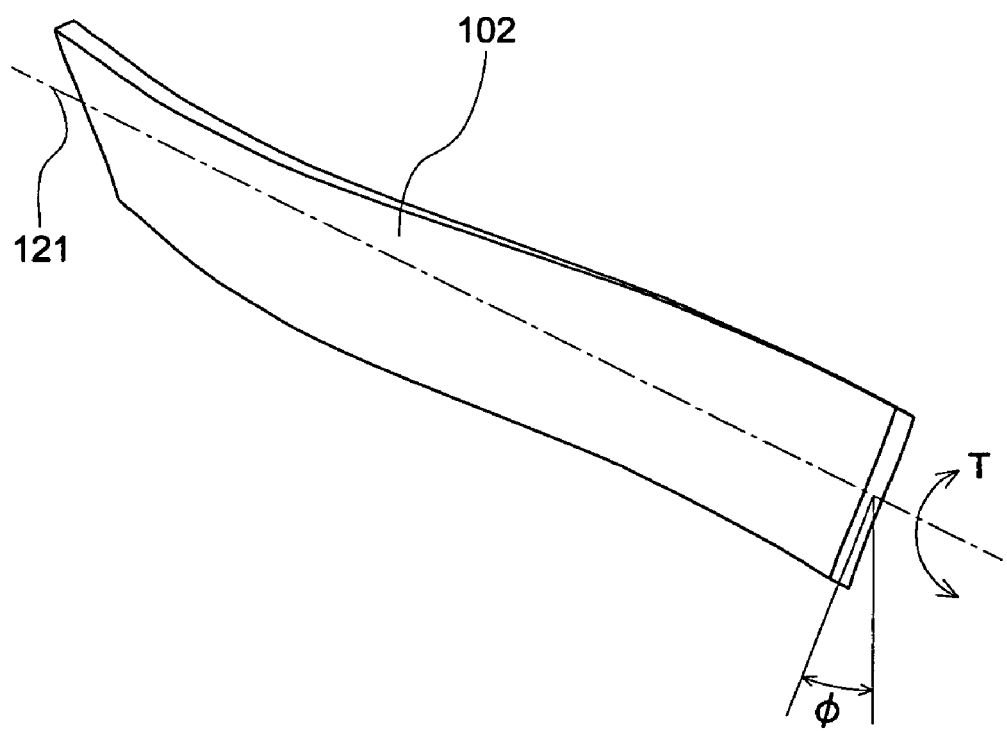

FIG. 5 is a schematic diagram showing the relationship between the drive frequency f of the drive element 151 and the deflection angle ε of the mirror 101 in a resonant scanner 100.

At the resonant frequency ω, the deflection angle ε of the mirror 101, namely, the amplitude is maximized, as shown in FIG. 5. When the drive frequency f is deviated from that level to f2 or the resonant frequency of the resonant scanner 100 is deviated to ω2, the deflection angle is reduced from the maximum ε1 to ε2. Thus, to maintain the amplitude of the mirror 101 at the maximum or constant level, it is necessary to continue driving constantly at the resonant frequency ω of the resonant scanner 100 or at a frequency having a certain difference from the resonant frequency ω.

The following describes the fluctuation of the resonant frequency as a problem to be solved by the present invention with reference to FIGS. 6(a) and 6(b), using the example of a change in the resonant frequency resulting from a temperature change. FIGS. 6(a) and 6(b) are schematic diagrams representing the rotational vibration of the torsion beam 102.

FIG. 6(a) shows the case in a quiescent state, while FIG. 6(b) shows the case of being twisted.

In FIG. 6(a), the torsion beam 102 is a flat plate having a length of l, a width of a and a thickness of b, and performs rotational vibration about the rotation axis 121. In FIG. 6(b), the spring constant of the torsion beam 102 is given by $G\alpha ab^3/l$ in Equation 1.

$$Mt = (G\alpha ab^3/l) \times \phi \quad \text{Equation 1}$$

Here Mt denotes the twisting moment of the torsion beam, G the modulus of transverse elasticity, $\alpha$ shows a coefficient related to the shape, and $\phi$ is a torsional angle.

When there is a change in the ambient temperature, the silicon is subjected to expansion and shrinkage so that the outer dimensions are changed. For example, if the temperature rises, the silicon expands, the length l also increases. Since the dimensions of the cross section (a×b) also increase, the spring constant of the torsion beam 102 increases. In the meantime, there is no change in the mass of the mirror 101 rotated and vibrated by the torsion beam 102. Accordingly, the resonant frequency $\omega$ fluctuates under the influence of temperature. This fluctuation is illustrated in FIG. 7.

Figure 7:
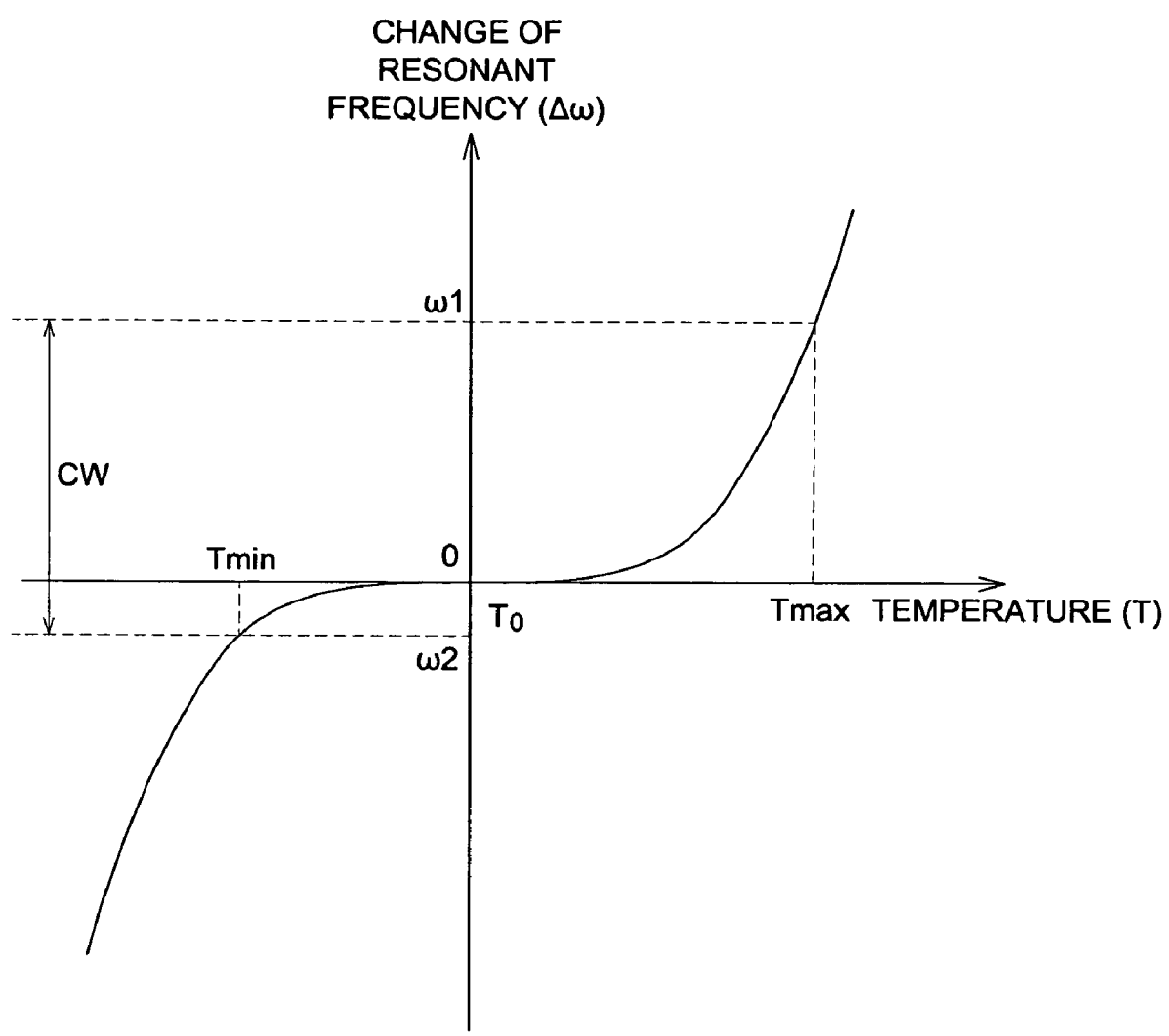
FIG. 7 is a schematic chart showing the relationship between the temperature and changes in resonant frequency.

FIG. 7 is a schematic chart showing the relationship between the temperature T and change $\Delta\omega$ in resonant frequency $\omega$.

In FIG. 7, the difference (change) $\Delta\omega$ between the resonant frequency $\omega 0$ at the normal temperature T0 and the resonant frequency $\omega$ at each temperature T is basically expressed by the tertiary expression of the temperature T. Assume that the temperature at which the resonant scanner 100 is actually employed ranges from the maximum Tmax to the minimum Tmin, the change $\Delta\omega$ of the resonant frequency at Tmax is $\omega 1$, and the change $\Delta\omega$ of the resonant frequency at Tmin is $\omega 2$. This requires at least the adjustment range CW equivalent to the change ($\omega 1 - \omega 2$) of the resonant frequency.

As described above, when deformation is applied to the piezoelectric element, an electric charge occurs. The piezoelectric element in this case is characterized in that its apparent rigidity is changed by the potential difference resulting from electric charge generated by deformation. To put it more specifically, the smaller the potential difference caused by the electric charge having been generated, the smaller the apparent rigidity. Conversely, the greater the potential difference, the greater the apparent rigidity. Namely, a resistive element is connected across the terminal of the piezoelectric element, and the resistance value is controlled, and thereby the potential difference across the terminals of the piezoelectric element is controlled. This procedure allows the apparent rigidity to be changed.

Further, when there is a change in the apparent rigidity of the piezoelectric element 111 as the control element 152 forming a part of the resonant scanner 100, the resonant frequency of the resonant scanner is also changed. Thus, the resonant frequency of resonant scanner can be controlled by controlling the aforementioned resistance value. To put it more specifically, an impedance (reactance) element is inserted in parallel with the control element 152, and the potential difference Vout resulting from the electric charge having occurred to the control element 152 is controlled in response to the temperature change. This procedure changes the apparent rigidity of the control element 152. This circuit is illustrated in FIG. 8.

FIG. 8 is a circuit diagram showing the equivalent circuit of the piezoelectric element constituting the control element 152 and the method of adjusting the resonant frequency $\omega$.

In FIG. 8, the control element (piezoelectric element) 152 can be expressed as a parallel connection with the impedance component wherein a capacitive component Cp2, capacitive component Cp1, inductance component Lp and resistive component Rp are connected in series. As an impedance element 153 for controlling the potential difference Vout resulting from the electric charge having occurred to this control element 152, a variable capacitor VC, for example, is connected in parallel. Its capacitance is adjusted depending on the temperature change. This makes it possible to control the potential difference Vout resulting from the electric charge having occurred to the control element 152 due to deformation which is caused by driving operation of the drive element 151. Further, a variable inductance can also be used as an impedance element 153.

As shown in FIG. 7, the impedance element 153 must have such an adjustment range as to control the resonant frequency to a predetermined level over the range of change CW of the resonant frequency in the temperature range wherein the resonant scanner 100 is actually utilized.

Referring to FIGS. 9(a), 9(b) and 9(c), the following describes the requirements that must be met by the resonant scanner 100 when keeping the resonant frequency at a predetermined level according to the aforementioned method: FIGS. 9(a), 9(b) and 9(c) are schematic diagrams showing a vibration system to illustrate the requirements that must be met by a resonant scanner.

As shown in FIG. 9(a), the torsion beam 102 and mirror 101 constitutes a second vibration system VS2 by means of the restoring force of the torsion beam 102 and the inertia moment of the mirror 101. In the meantime, the driving piece 103 is provided with the restoring force and the inertia moment, and constitutes a first vibration system VS1.

Accordingly, the vibration system of the resonant scanner 100 is a two-degree-of-freedom vibration system. As shown in FIG. 9(b), this system can be expressed as a composite vibration system wherein two pairs of springs and weights—a spring of spring constant k1 and a weight of mass m1, and a spring of spring constant k2 and a weight of mass m2 —are connected in series. This composite vibration system is characterized by two modes of natural vibration, as shown in FIG. 9(b), i.e., the in-phase mode (resonant frequency f1) wherein each weight vibrates at the same phase, and the opposite phase mode (resonant frequency f2) wherein each weight vibrates at the opposite phase. The former mode (f1)<latter mode (f2) in the resonant frequencies of the composite vibration system. In the displacement of the weight of mass m2, the former mode>latter mode. They can be selected for use according to particular applications.

As shown in FIG. 9(c), when the first vibration system VS1 and the second vibration system VS2 are assumed as separate independent systems, if there is a big difference in resonant frequencies (g1 and g2) of each independent system, the resonant frequency f1 in the same phase mode of the composite system comes closer to the lower resonant frequency of the independent system. The resonant frequency f2 in the reverse phase mode comes closer to the higher resonant frequency of the independent system. In this case, the vibration of the independent system closer to the resonant frequency of the composite system has greater amplitude.

For example, assume that the resonant frequency g1 of the driving piece (first vibration system VS1) 103<<resonant frequency g2 of the torsion beam (second vibration system VS2) 102. In this case, the driving piece 103 has greater amplitude in the same phase mode, while the torsion beam 102 has greater amplitude in the reverse phase mode.

In the present invention, to improve the sensitivity in the adjustment in the resonant frequency by the control element 152 and to increase the amplitude of the torsion beam 102, the amplitude of the vibration of the driving piece 103 and that of the torsion beam 102 are preferably increased. To achieve this object, it is preferred that the frequencies of their vibrations in the independent system should be made close to each other; namely, the resonant frequency g1 of the driving piece 103 should coincide with the resonant frequency g2 of the torsion beam 102. When f1 and f2 coincide with each other, the resonant frequency f1 in the same phase mode and the resonant frequency f2 in the reverse phase mode can be expressed by the following equation (2):

$$f1,2 = mt;epmrl;\sqrt{2 \pm rl};\sqrt{2rlxrlxmx} \cdot f_0 \qquad (2)$$

Here the f0 denotes resonant frequency (f0=g1=g2) of the independent system, and the f1 and f2 indicate resonant frequencies in the same phase mode and reverse phase mode, respectively.

Figure 10:
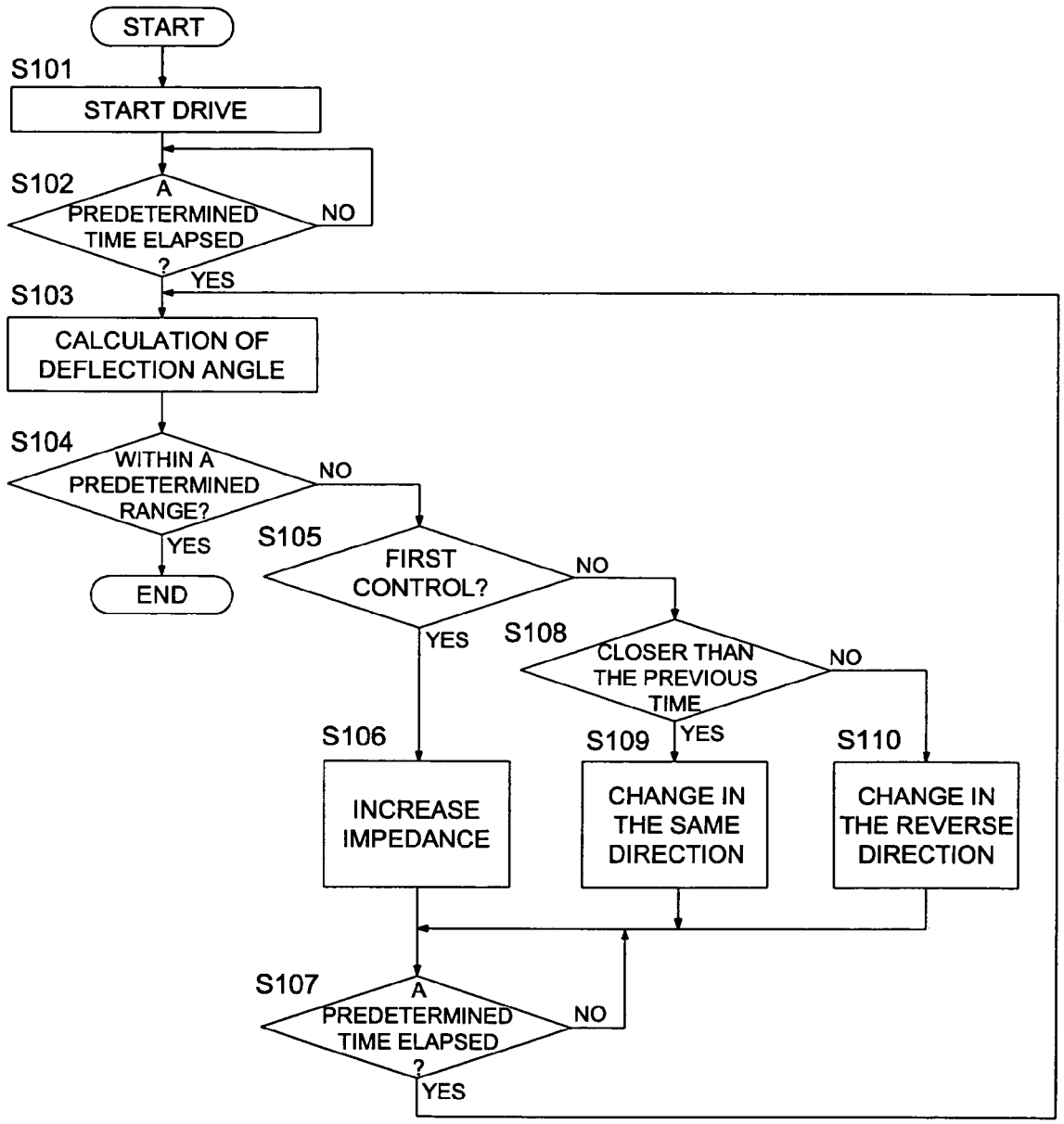
FIG. 10 is a flow chart showing the flow of the operation in the control of the resonant frequency of the resonant scanner.

The following describes the method of controlling the resonant frequency ω of the resonant scanner 100 with reference to FIG. 10. FIG. 10 is a flow chart showing the flow of the operation in the control of the resonant frequency ω of the resonant scanner 100.

In FIG. 10, application of the drive signal Vin to the drive element is initiated at a predetermined frequency in Step S101. In Step S102, verification is made to see whether or not a predetermined time has passed to allow the operation of the drive element 151 to be stabilized. The system waits in Step S102 until this predetermined time passes. After the lapse of a predetermined time (Step S102: YES), the deflection angle ε of the mirror 101 is calculated in Step S103. To put it more specifically, the potential difference Vout is measured when the impedance value of the impedance element 153 between the terminals of the control elements 152 is equal to the predetermined value. As described with reference to FIG. 4, the deflection angle ε of the mirror 101 is obtained from the potential difference Vout.

In Step S104, verification is made to see whether or not the deflection angle ε is kept within a predetermined range. If it is kept within the predetermined range (Step S104: YES), the operation terminates and the system proceeds to the stage of actual operations such as printing and display. The description on this will be omitted. If it is not kept within the predetermined range (Step S104: NO), the system judges that the resonant frequency ω in all the systems of the resonant scanner 100 is deviated. Control is provided to ensure that the deflection angle ε is kept within a predetermined range.

To put it more specifically, verification is made in Step S105 to see whether or not the resonant frequency control is the first attempt. In the case of the first resonant frequency control (Step S105: YES), the impedance of the impedance element 153 is increased by a predetermined value in Step S106. In Step S107, verification is made to see whether or not a predetermined time has passed to allow the operation of the drive element 151 to be stabilized. The system waits in Step S107 until this predetermined time passes. After the lapse of the predetermined time (Step S107: YES), the system goes back to the Step S103, and repeats the aforementioned operation.

If it has been judged in Step S105 that the control is not the initial control (Step S105: NO), verification is made to see in Step S108 whether or not the deflection angle ε of the mirror 101 is closer to the predetermined range than that in the previous control. If the deflection angle ε is closer to the predetermined range than that in the previous control (Step S108: YES), the impedance of the impedance element 153 is increased by the predetermined value in Step S109, and the control proceeds to Step S107. After that, the aforementioned operation is repeated.

If it has been determined in Step S108 that the deflection angle ε of the mirror 101 is farther from the predetermined range than that in the previous control (Step S108: NO), the impedance of the impedance element 153 is decreased by a predetermined value in Step S110, and the control proceeds to Step S107. After that, the aforementioned operation is repeated.

The control of the resonant frequency ω is required to cope with the temperature rise of the resonant scanner 100 per se caused by the drive of the resonant scanner 100, temperature rise inside such an apparatus as a printer and a display incorporating the resonant scanner 100, and the fluctuation of the ambient temperature around the apparatus. Accordingly, the aforementioned control must be provided on a periodic basis during the operation.

For example, if the apparatus is a printer, control is preferably performed during the period when printing is not performed before and after the current printing sheet, in the display during the return period wherein the scanning line moves from the bottom line to the top line. It is also possible to make such arrangements that a temperature sensor 240 is provided in the vicinity of the resonant scanner 100, and control is initiated when a temperature change in a predetermined time period has exceeded a predetermined level. When the deflection angle ε of the mirror 101 fails to be brought within a predetermined range even if the value of the impedance element 153 has been adjusted, the system determines that an error has occurred, and suspends the operation of the equipment to prompt repair.

In the aforementioned first embodiment, the deflection angle ε of the mirror 101 is described as being calculated from the measurement of the potential difference Vout resulting from the electric charge produced in the control element 152. Without the present invention being restricted thereto, for example, the actual light scanning range can be detected by the light detector or the like. Examples are illustrated in FIG. 11 and FIG. 12.

Figure 11:
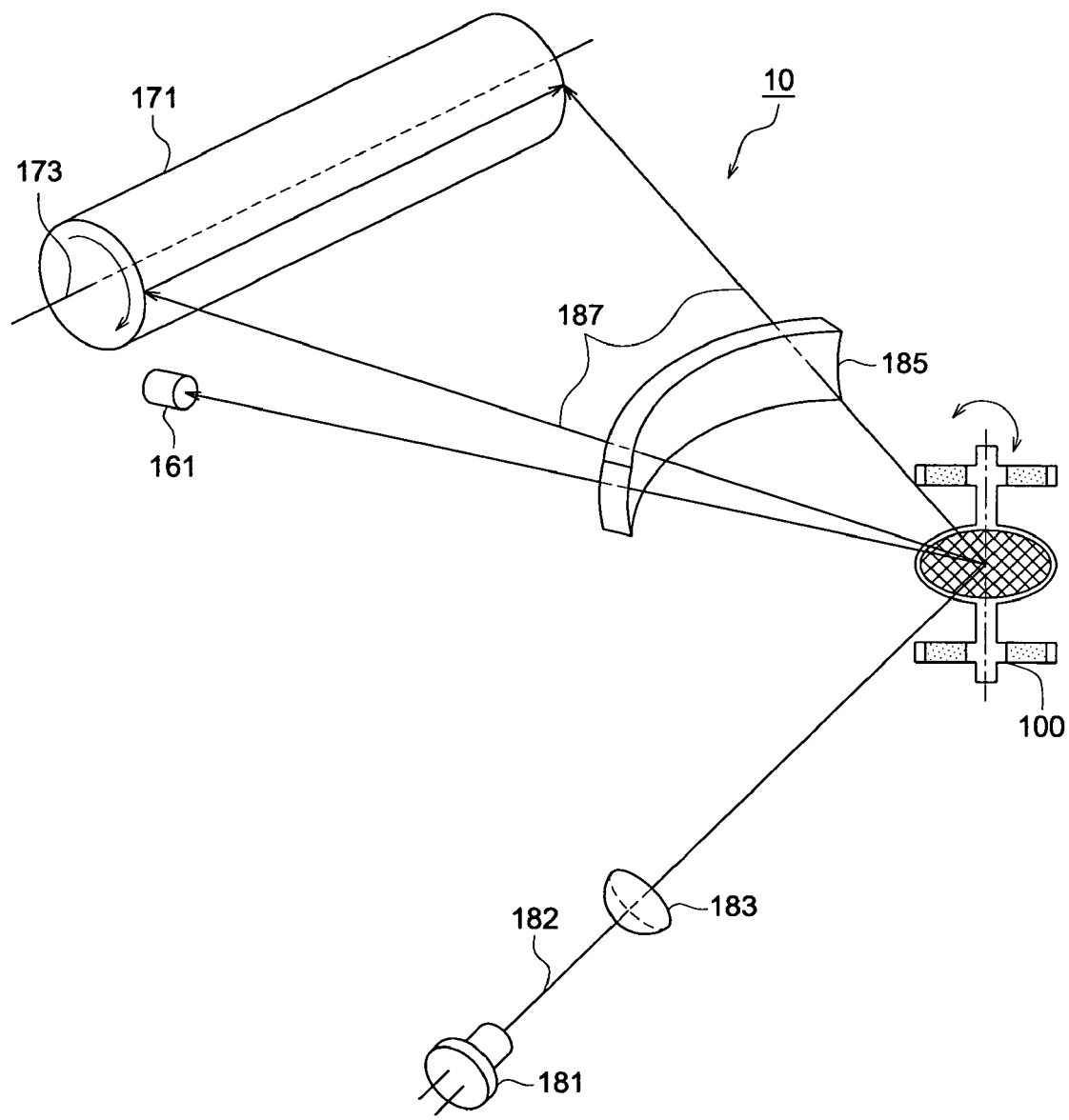
FIG. 11 is a schematic diagram showing an example wherein the resonant scanner is used as a one-dimensional main scanning means for the photosensitive drum of the printer and photocopier.

FIG. 11 is a schematic diagram showing an example wherein the resonant scanner 100 is used as a one-dimensional main scanning device for the photosensitive drum of the printer and photocopier. The laser beam 182 having been outputted from the semiconductor laser 181 is deflected by the resonant scanner 100 through a collimating lens 183, and is subjected to main scanning as a main scanning beam 187 on the photosensitive drum 171 in the horizontal direction through the main scanning lens 185.

In the meantime, the photosensitive drum 171 is rotated about the rotation axis 173, whereby sub-scanning is performed in the direction perpendicular to the main scanning. Thus, the surface is scanned by sub-scanning as well as main scanning. To adjust proper timing for data output in the direction of main scanning, some of the printers and photocopiers are provided with a photodetector 161 outside the writing range of the photosensitive drum 171. This device can be used to ensure direct detection of the deflection angle ε of the mirror 101 without any further addition of the costs and space.

Figure 12:
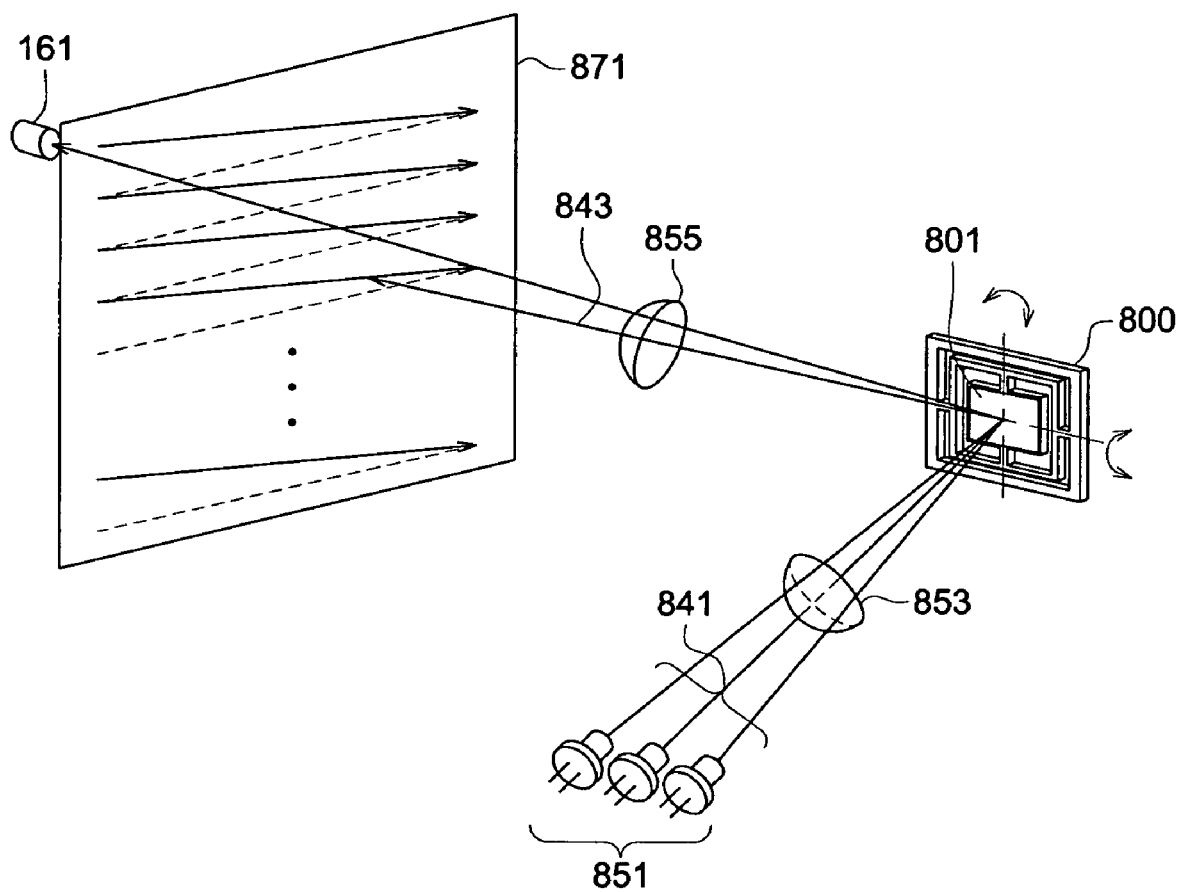

FIG. 12 is a schematic diagram showing an example wherein a two-dimensional resonant scanner formed of the resonant scanners combined in the horizontal and vertical directions is used for surface scanning in a laser display or the like. The laser beam bundle 841 having been outputted from the semiconductor lasers 851 of R, G and B colors is deflected by the two-dimensional resonant scanner 800 through a collimating lens 853, and is used as a two-dimensional scanning beam 843 for two-dimensional scanning of the display screen 871 through a scanning lens 855. To adjust proper timing with the data output, a photodetector 161 is provided outside the display range of the display screen 871. This is used for direct detection of the deflection angle ε of the mirror 801.

Further, in the example shown in FIG. 10, the impedance of the impedance element 153 is once increased to check the direction where the deflection angle ε of the mirror 101 changes. This step is used to determine the control direction of the impedance element 153. It is also possible to make such arrangements that a temperature sensor 240 is provided to measure the temperature in the vicinity of the resonant scanner 100, and to determine the control direction of the impedance element 153. In this case, the direction of increasing or decreasing the impedance of the impedance element 153 can be determined according to the temperature detected in the Step S106 of FIG. 10. This arrangement reduces the time required for control.

As described above, the first embodiment of the present invention uses an electromechanical transducer is used as the control element. This arrangement controls the potential difference resulting from the electric charge that is produced in the control element by the rotational vibration of the optical deflector. This procedure ensures that the fluctuation of the resonant frequency due to various factors such as a temperature change is corrected to a predetermined level, and the amplitude of the resonant scanner is adjusted to a predetermined level. Thus, this method provides an optical deflector characterized by stable amplitude and speed.

Figure 13:
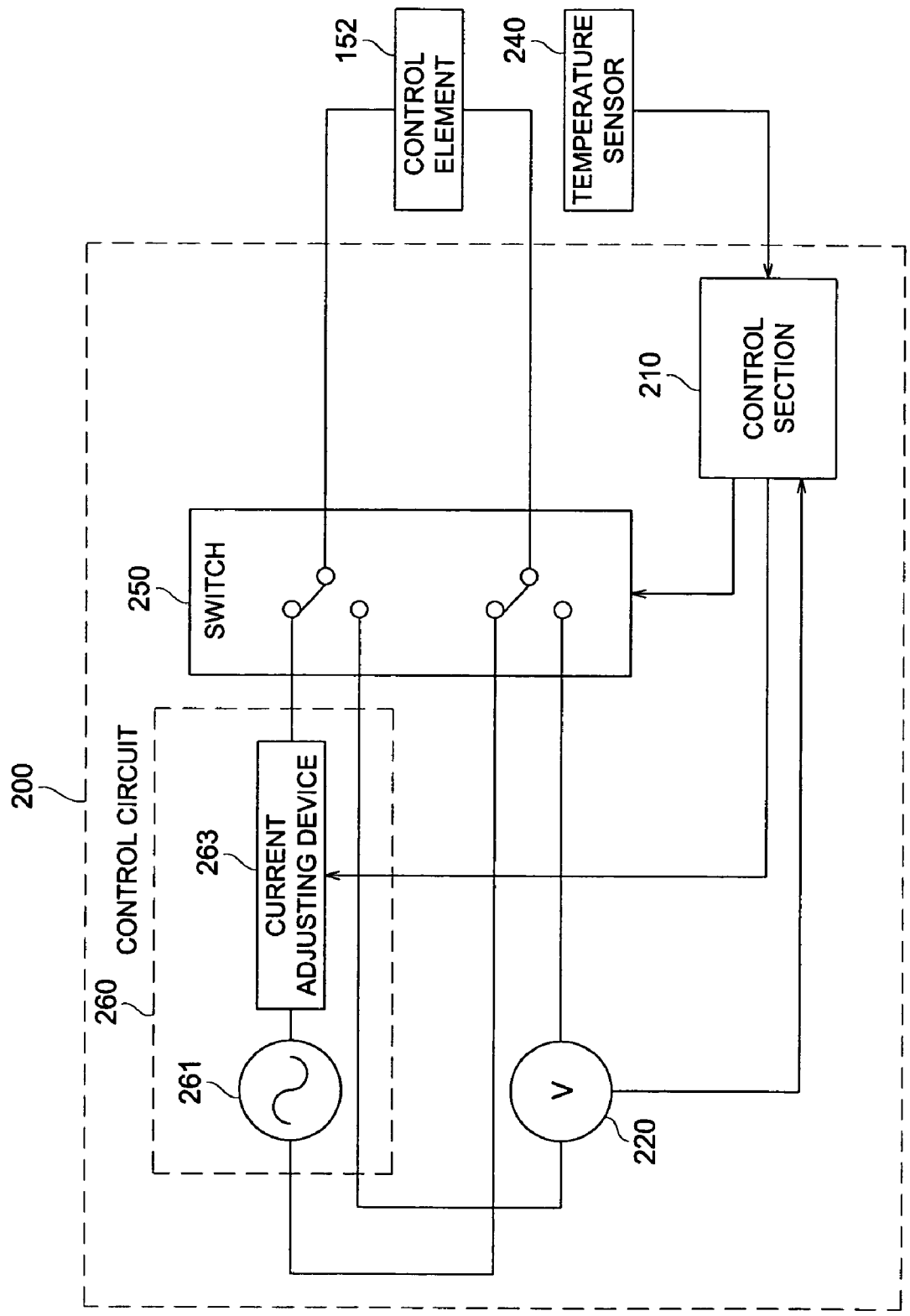
FIG. 13 is a schematic diagram showing an example of the circuit configuration of the control circuit for using to drive the control element as well.

The following describes the second embodiment of the present invention with reference to FIG. 13. In the aforementioned first embodiment, the drive element 151 and control element 152 are used only for drive and control, respectively. In this second embodiment, the circuit of the control element 152 is switched. Then, except when the deflection angle ε of the mirror 101 is measured, the drive signal Vin is applied also to the control element 152 so that this element will function as a drive element, whereby the driving force is improved.

To be more specific, as shown in FIG. 2(*a*), FIG. 2(*b*), FIG. 3(*a*) and FIG. 3(*b*), if the control element 152 is made of the same material, size and shape as that of the drive element 151, it is possible to produce a so-called bimorph configuration wherein piezoelectric elements are bonded on both surfaces of the driving piece 103. This configuration doubles the driving force, with the result that the resonant scanner 100 can be formed of a smaller piezoelectric element 111 if the mirror 101 has the same size. This method allows the overall size of the apparatus to be reduced. Further, if the piezoelectric element 111 has the same size, it is possible to mount a larger mirror 101 or a thicker and heavier mirror 101 that ensures a higher mirror accuracy.

Referring to FIG. 13, the following describes the method of using the control element 152 for driving as well: FIG. 13 is a schematic diagram showing an example of the circuit configuration of the control circuit 200 for using the control element 152 for driving as well.

In FIG. 13, the control circuit 200 for driving the control element 152 includes a drive source 261 for generating drive signal Vin to be applied to the control element 152; a current adjusting device 263 for adjusting the driving current to drive the control element 152; a switch 250 for switching the mode between drive and detection of the control element 152; a detection section 220 formed of a potential difference detector for detecting the state of resonance of the control element 152; and a control section 210 for controlling these components.

The current adjusting device 233 adjusts the driving current according to the drive frequency of the drive signal Vin depending on the signal from the control section 210, and control is provided so as to maintain a predetermined state of resonance of the resonant scanner 100. The drive source 261 and current adjusting device 263 constitute the control element drive section 260. The control section 210 switches the connection to the control element 152 between the detection and drive modes at a timed interval through the switch 250.

The timing for switching the control element 152 from the drive mode to the detection mode is exemplified by the timing illustrated with reference to FIG. 10 through FIG. 12. To be more specific, when this resonant scanner 100 is used in a printer, (1) switching is performed for each line or a predetermined number of lines during the non-printing period when shifting from one line to another; (2) switching is performed for each line or a predetermined number of lines during the non-printing period when shifting the printing operation from a sheet of paper to the next sheet of paper; (3) switching is performed without fail at the start of printing after pause for a predetermined time period; and (4) switching is performed at every page break.

For example, when this resonant scanner 100 is used in the display, (1) switching is performed for each line or a predetermined number of lines during the non-display period when shifting to the next line after terminating the scanning of a certain line out of the lines to be scanned; (2) switching is performed for each screen or a predetermined number of screens during the non-display period when returning to the scanning start point after termination of scanning of one screen; and (3) switching is performed for each frame or a predetermined number of frames during the non-display period when returning to the scanning start point after termination of scanning of one frame.

It is also possible to arrange such a configuration that a temperature sensor 240 for detecting the temperature in the vicinity of the control element 152 is provided, independently of the field of application of the aforementioned resonant scanner 100, and detection is started when temperature change at a predetermined time period has reached a predetermined value or more.

During the aforementioned detection, the control element 152 is used for detection, not for driving. Accordingly, although the driving force is reduced, amplitude is not subjected to abrupt decrease in the state of resonance despite a change in driving force. The amplitude undergoes a gradual decrease with the lapse of time determined by the damping coefficient of all the systems of the resonant scanner. This arrangement ensures that driving by the control element 152 is temporarily suspended, and the operation mode is switched over to the detection mode.

If the aforementioned result of detection is deviated from the predetermined conditions (e.g., frequency f, deflection angle ε, and potential difference Vout) by a predetermined value or more, control is provided in such a way that the driving current of the drive element 151 and/or control element 152 is adjusted so that the result of detection will be kept within the predetermined value of the predetermined conditions.

The following timing is preferred for the aforementioned detection: When detecting the potential difference Vout resulting from the electric charge produced in control element 152 while the deflection angle ε is great. Because greater the deformation of the control element 152, the greater the amount of electric charge to be produced. Thus, the detection accuracy is also improved. In the case of a printer, this state is achieved when deflection is made to reach the angle closest to the maximum level in the main scanning direction. This state occurs outside the normal printing range, and corresponds to the area where there is no printing operation at all. This is convenient. Conversely, it is also possible to arrange such a configuration that the area outside the printing range is assumed as a range that can be detected, and detection operation is performed at the aforementioned timed interval in the range that can be detected.

The same description applies to the case of scanning in a display. When deflection is performed up to the maximum angle in the horizontal scanning mode, this state often occurs outside the display range of the actual screen, and corresponds to the range that does not affect display. This is convenient. In this case as well, the range outside the actual display range is assumed as a range that can be detected, and detection operation can be performed at the aforementioned timed interval in the range that can be detected.

As described above, in addition to the advantages of the first embodiment, the second embodiment of the present invention offers an advantage that the control element 152 can be used for driving. This arrangement doubles the driving force, with the result that the resonant scanner 100 can be formed of a smaller piezoelectric element 111 if the mirror 101 has the same size. This method allows the overall size of the apparatus to be reduced. Further, if the piezoelectric element 111 has the same size, it is possible to mount a larger mirror 101 or a thicker and heavier mirror 101 that ensures a higher mirror accuracy.

Figure 14:
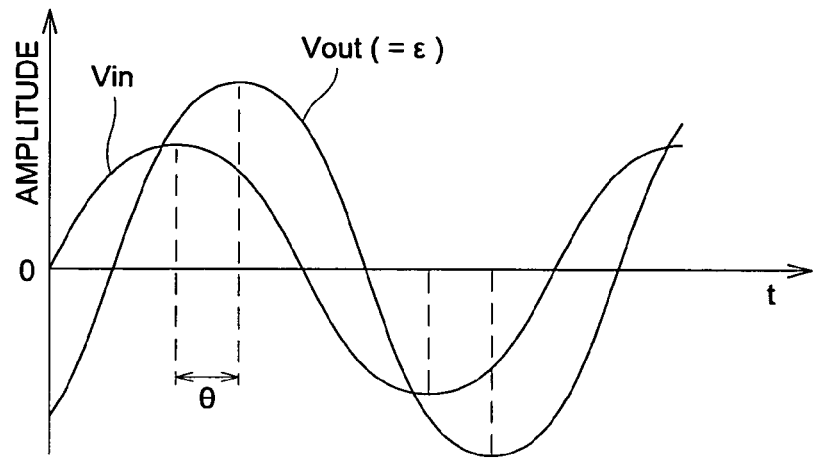
FIG. 14 is a schematic diagram showing the relationship of phase between the drive signal applied to the drive element and the potential difference generated in the control element.
Figure 14:
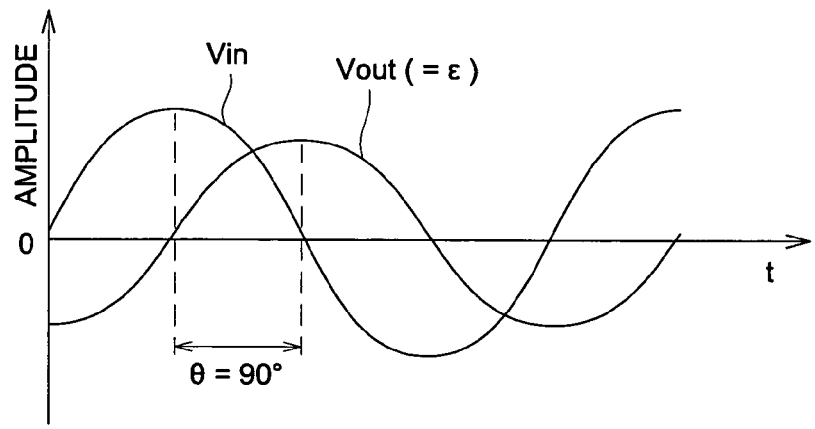
Figure 14:
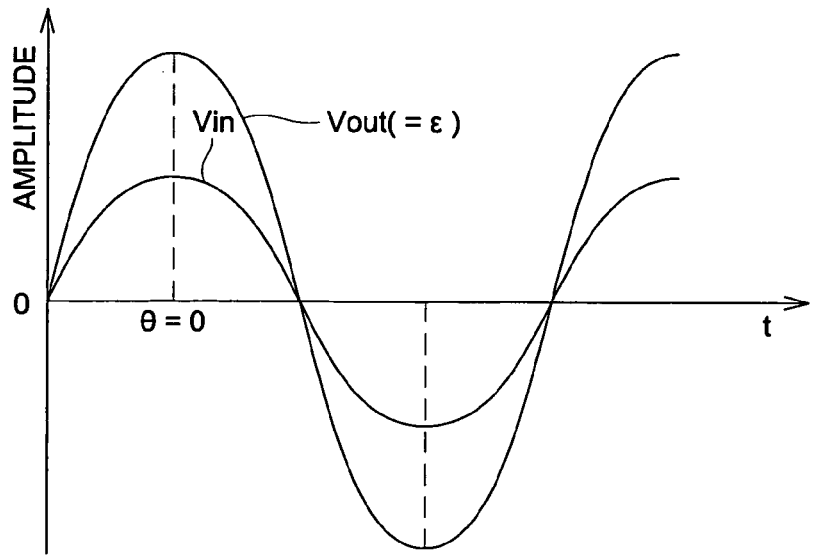

Referring to FIG. 14, the following describes the third embodiment of the present invention: In the aforementioned first and second embodiment, the state of resonance of the resonant scanner 100 is detected using the method of detecting the electric charge occurring to the control element 152. In this third, embodiment, the state of resonance of the resonant scanner 100 is detected using the method of comparison between the phase of the drive signal Vin applied to the drive element 151, and the deflection angle ε of the mirror 101, i.e., the phase of the potential difference Vout resulting from the electric charge occurring to the control element 152.

FIG. 14 is a schematic diagram showing the relationship of phase between the drive signal Vin applied to the drive element 151 and the potential difference Vout occurring to the control element 152, i.e., the deflection angle ε of the mirror 101. FIG. 14(a) shows an intermediate state deviated from the state of resonance, FIG. 14(b) indicates a non-resonance state, and FIG. 14(c) shows a state of resonance.

In FIGS. 14(a), 14(b), 14(c) in the resonant scanner 100 of the present invention, in the phase of the potential difference Vout is deviated from that of the drive signal Vin by θ in the case of the intermediate state deviated from the state of resonance (FIG. 14(a)). In the state of perfect non-resonance (FIG. 14(b)), the phase difference θ is 90°. In the state of resonance (FIG. 14(c)), the phase difference θ is 0 (zero). Thus, the state of resonance of the resonant scanner 100 can be detected by obtaining the phase difference θ between the drive signal Vin and potential difference Vout.

To put it more specifically, in the circuit of FIG. 13, a phase detector is arranged instead of the potential difference detector constituting the detection section 220, and the phase of the potential difference Vout occurring to the control element 152 is measured at the same timed detection interval described with reference to the first and second embodiments. The phase of the measured potential difference Vout is compared with that of the drive signal Vin applied to the drive element 151. If the phase difference θ is equal to or greater than a predetermined value, the system determines that the current state is deviated from the state of resonance, and controls the frequency f of the drive signal Vin to move it in the direction wherein their phases will coincide with each other.

The phase difference can be detected as follows: Mere phase deviation is detected, and the frequency f of the drive signal Vin is controlled. Thus, adjustment is made to reach a desired state of resonance by trial and error. This method can be used, but the following method is more preferable: Detection is made to the extent of finding out the direction of the phase deviation, i.e., the positive or negative sign of the phase difference, and the control direction is determined accordingly. After that, the frequency f of the drive signal Vin is controlled. This procedure provides better control efficiency although the apparatus is slightly more complicated.

As described above, in addition to the advantages described in the first and second embodiments, the third embodiment of the present invention offers the advantage of ensuring more efficient adjustment to the state of resonance by detecting the phase difference θ between the drive signal Vin and potential difference Vout.

The electromechanical transducer of the present invention can use magnetostrictive force or electromagnetic force. When magnetostrictive force is used, the amount of deformation can be adjusted if a change in the magnetic field caused by deformation is controlled for example, by an external magnetic field. When electromagnetic force is utilized, the amount of deformation can be adjusted if a change in the electric field and magnetic field resulting from deformation (displacement) is controlled.

Further, resonant frequency ω can be actively changed according to the present invention. For example, a laser printer includes a process of heating and fixing a resin-made ink called toner on the sheet of paper. This process reduces the moisture contained in the sheet of paper, and temporarily reduces the dimensions of the sheet of paper in some cases. Thus, in the duplex printing mode, the size of the toner image must be reduced on the rear surface. The size of the toner image can be reduced by adjusting the resonant frequency ω to a level higher than that at the time of printing on the front surface based on the present invention and by adjusting the drive frequency accordingly.

Lastly, the control element 152 can be mounted not only on the driving piece, but also on any position as long as bending deformation occurs in synchronism with the mirror 101. Special-purpose vibration pieces can be provided on the mirror 101 or the torsion beam 102, and the control element 152 may be bonded thereto. The control element 152 may be bonded in parallel to the driving piece 103 or bonded on the surface of any side of the torsion beam 102.

As described above, the embodiment of the present invention provides an optical deflector characterized by stable amplitude and speed wherein the electromechanical transducer is used as a control element to control the potential difference resulting from the electric charge occurring in the control element due to rotational vibration of the optical deflector, whereby the fluctuation of the resonant frequency caused by various factors such as a temperature change is corrected to a predetermined level, and the amplitude of the resonant scanner is kept at a predetermined level.

The detailed arrangement and operation of each structure constituting the optical deflector as an embodiment of the present invention can be adequately modified, without departing from the technological spirit and scope of the present invention.

What is claimed is:

1. An optical deflector for scanning light beam, comprising:
   an optical element which rotationally vibrates about a rotation axis;
   a vibration member which includes the optical element;
   a drive element for driving the vibration member by deforming the vibration member, the drive element being provided on the vibration member and constituted of a rectangular electromechanical transducer with a longer side thereof being in a direction perpendicular to the rotation axis;
   a control element that is adapted to generate an electric charge as a result of a deformation thereof caused by the deformation of the vibration member, the control element being provided on the vibration member at a position where the vibration member is deformed by the drive element, and being constituted of a rectangular electromechanical transducer with a longer side thereof being in a direction perpendicular to the rotation axis; and
   a voltage control element for controlling an amount of a difference in potential across the control element, such potential resulting from the electric charge generated by the deformation of the control element.

2. The optical deflector of claim 1, comprising:
   two couples of the drive elements and the control elements, wherein the couple is constituted of the drive element and the control element arranged facing each other on opposite sides of the vibration member, and the two couples are arranged in rotational symmetry with the rotation axis.

3. The optical deflector of claim 2, comprising:
   two pairs of the drive elements and the control elements, each of which is constituted of the two couples arranged in rotational symmetry with the rotation axis,
   wherein two pairs are arranged in line symmetry, with the optical element therebetween, with respect to the direction perpendicular to the rotation axis.

4. The optical deflector of claim 1, wherein the voltage control element varies stiffness of the control element by controlling the difference in potential caused by the electric charge generated in the control element by deformation of the vibration member, whereby a resonance frequency of the vibration member is adjusted.

5. The optical deflector of claim 1, wherein the voltage control element includes an impedance element connected between electrodes of the control element.

6. The optical deflector of claim 1, comprising:
   a control circuit for controlling an operation of the control element, the control circuit including:
   a detection section for detecting the deformation of the vibration member caused by the rotational vibration.

7. The optical deflector of claim 6, wherein the detection section detects the deformation of the vibration member caused by the rotational vibration by measuring the difference in potential caused by the electric charge generated in the control element by the deformation of the vibration member.

8. The optical deflector of claim 6, wherein the control circuit comprises a control element drive section which applies a drive signal to the control element for driving the vibration member.

9. The optical deflector of claim 8, wherein the control circuit makes the control element drive section stop applying the drive signal to the control element at a predetermined timing while making the detection section detect the deformation of the vibration member caused by the rotational vibration.

10. The optical deflector of claim 8, wherein the control circuit controls the drive signal applied to the control element by the control element drive section based on a result of the detecting, by the detection section, of the deformation of the vibration member caused by the rotational vibration, and whereby adjusts the resonance frequency of the vibration member.

11. The optical deflector of claim 9, comprising:
    a temperature sensor for detecting a temperature in a vicinity of the vibration member,
    wherein the predetermined timing is when a change of the temperature in the vicinity of the vibration member becomes not less than a predetermined value.

12. The optical deflector of claim 1, wherein each of the drive element and the control element includes a piezoelectric element.

13. An optical deflector for scanning light beam, comprising:
    an optical element which rotationally vibrates about a rotation axis;
    a vibration member which includes the optical element;
    a drive element for driving the vibration member by deforming the vibration member, the drive element being provided on the vibration member and constituted of an electromechanical transducer;
    a control element that is adapted to generate an electric charge as a result of a deformation thereof caused by the deformation of the vibration member, the control element being provided on the vibration member at a position where the vibration member is deformed by the drive element, and being constituted of an electromechanical transducer; and
    a voltage control element for controlling an amount of a difference in potential across the control element, such potential resulting from the electric charge generated by the deformation of the control element.

14. The optical deflector of claim 13, wherein the drive element has a rectangular shape with a longer side thereof being in a direction perpendicular to the rotation axis.

15. The optical deflector of claim 13, wherein the control element has a rectangular shape with a longer side thereof being in a direction perpendicular to the rotation axis.

16. An optical deflector for scanning light beam, comprising:
    a vibration member which includes an optical element and rotationally vibrates about a rotation axis;
    a first drive element for driving the vibration member by deforming the vibration member, the first drive element being provided on a front surface of the vibration member and being constituted of an electromechanical transducer;
    a first control element that is adapted to generate an electric charge as a result of a deformation thereof caused by deformation of the vibration member, the first control element being provided on rear surface of the vibration member, having in-line symmetry with the first drive element, and being constituted of an electromechanical transducer;
    a second drive element for driving the vibration member by deforming the vibration member, the second drive element being provided on a rear surface of the vibration member in rotational symmetry about the rotational axis with the first drive element and being constituted of an electromechanical transducer;

a second control element that is adapted to generate an electric charge as a result of a deformation thereof caused by deformation of the vibration member, the second control element being provided on front surface of the vibration member, having in-line symmetry with the second drive element, and being constituted of an electromechanical transducer;

a voltage control element for controlling an amount of a difference in potential across the control elements, such potential resulting from the electric charge generated by the deformation of the control elements.

17. The optical deflector of claim 16, wherein the first and second control elements have a rectangular shape with a longer side thereof being in a direction perpendicular to the rotation axis.

18. The optical deflector of claim 16, wherein the first and second drive elements have a rectangular shape with a longer side thereof being in a direction perpendicular to the rotation axis.

* * * * *